(12) United States Patent
Everett

(10) Patent No.: US 6,886,839 B2
(45) Date of Patent: May 3, 2005

(54) FOLDABLE JOGGING STROLLER

(76) Inventor: Richard C Everett, 225 Sunshine La., West Lynn, OR (US) 97068

( * ) Notice: Subject to any disclaimer, the term of this patent is extended or adjusted under 35 U.S.C. 154(b) by 101 days.

(21) Appl. No.: 10/228,238

(22) Filed: Aug. 27, 2002

(65) Prior Publication Data

US 2004/0041367 A1 Mar. 4, 2004

(51) Int. Cl.$^7$ ................................................ B62B 7/06
(52) U.S. Cl. ...................... 280/62; 280/642; 280/47.38; 280/658; 280/650; 403/109.3
(58) Field of Search .......................... 280/642, 62, 647, 280/650, 643, 648, 649, 657, 658, 43.1, 47.38; 297/16.1; 403/109.1, 109.2, 109.3

(56) References Cited

U.S. PATENT DOCUMENTS

| | | | | |
|---|---|---|---|---|
| 4,386,790 A | * | 6/1983 | Kassai ........................ | 280/650 |
| 4,681,340 A | * | 7/1987 | Pasquini ..................... | 280/642 |
| 5,188,389 A | * | 2/1993 | Baechler et al. ............ | 280/650 |
| 5,388,853 A | * | 2/1995 | Lauro ......................... | 280/642 |
| 5,522,614 A | * | 6/1996 | Eyman et al. .............. | 280/642 |
| 5,590,896 A | * | 1/1997 | Eichhorn .................... | 280/642 |
| 5,611,560 A | * | 3/1997 | Thimmig .................... | 280/642 |
| 5,634,654 A | * | 6/1997 | Lin ............................. | 280/649 |
| 5,695,212 A | * | 12/1997 | Hinkston .................... | 280/642 |
| 5,887,889 A | * | 3/1999 | Andrus ....................... | 280/647 |
| 5,915,712 A | * | 6/1999 | Stephenson et al. ..... | 280/304.1 |
| 5,934,153 A | * | 8/1999 | Yang ......................... | 74/551.3 |
| 5,938,230 A | * | 8/1999 | Huang et al. ............... | 280/650 |
| 6,036,220 A | * | 3/2000 | Zhen .......................... | 280/642 |
| 6,062,589 A | * | 5/2000 | Cheng ........................ | 280/647 |
| 6,152,477 A | * | 11/2000 | Hsin et al. .................. | 280/642 |
| 6,170,853 B1 | * | 1/2001 | Brown et al. ............... | 280/642 |
| 6,409,205 B1 | * | 6/2002 | Bapst et al. ................ | 280/642 |
| 2003/0155745 A1 | * | 8/2003 | Everett ....................... | 280/642 |

* cited by examiner

Primary Examiner—Brian L. Johnson
Assistant Examiner—Kelly E Campbell
(74) Attorney, Agent, or Firm—Edward E. Roberts

(57) ABSTRACT

There is provided a jogging stroller having a collapsible frame transformable from an erected position to a collapsed position, the frame including a base structural assembly and an upper structural assembly, the base assembly having a rear axle with a wheel coupled at each end, a fork assembly pivotally coupled thereto having two tubes extending to support a front wheel, and a pair of upright support members fixedly coupled thereto. The upper structural assembly includes a handlebar member having extending handlebar tubes, the other ends of the handlebar tubes slidably engaged with a respective interconnect member pivotally coupled to the free end of a respective upright support member, and further has two additional tubes each having first ends fixedly attached to respective interconnects and second ends connected at the front wheel to respective tubes extending from the fork assembly. Each interconnect member including means for holding the upper frame in an upright user position and for releasing the interconnect member to slide up the respective handlebar tube to collapse the upper structural assembly over the base structural assembly.

6 Claims, 5 Drawing Sheets

FOLDABLE JOGGING STROLLER

BACKGROUND OF THE INVENTION

The background of the invention will be discussed in two parts.

1. Field of the Invention

This invention relates to strollers for children, and more particularly to a three-wheeled jogging stroller that may be utilized during jogging or running exercise, and that is easily foldable for transit and storage.

2. Description of the Prior Art

With physical fitness in mind, some children strollers have evolved into primarily three-wheeled vehicles that can be utilized while jogging or running. Generally referred to as jogging strollers, the user, while pushing the child, or children, therein, may conveniently exercise by jogging or running. The typical three-wheeled jogging stroller is configured with a frame assembly formed of tubular aluminum for vehicular strength and light weight, one or two seats usually of a flexible cloth-like material, and pneumatic spoked-wheel tires. The two rear wheels are often of a diameter approximating that of an elementary school child's bicycle with the front wheel of the same or somewhat smaller diameter. Some such jogging strollers have been designed and configured for folding, disassembly, or a combination of both, thus providing for convenience and versatility in transportation and storage.

Various jogging strollers having mechanisms for folding the strollers are known in the art and generally include frame member connecting means for retaining the stroller frame members in non-folded state and release means for folding, or collapsing, the stroller frame members into a convenient configuration for transportation or storage. Some such folding mechanisms are disclosed in U.S. Pat. No. 5,536,033 issued to Paul Hinkston on 16 Jul. 1996, in U.S. Pat. No. 5,887,889 issued to Michael Andrus on 30 Mar. 1999, in U.S. Pat. No. 6,302,613 B1 issued to Red Lan on 16 Oct. 2001, and in U.S. Pat. No. 6,267,405 B1 issued to Chin-Chiao Chen on 31 Jul. 2001. Such devices are illustrative of the varied arrangements whereby attempts have been made to improve the folding, or collapsing of jogging strollers for ease of transit and storage.

However, in general, the prior art folding devices remain limited in optimum folding characteristics such as ease of operation and simplicity of design. What is needed is a folding mechanism providing for improved folding of jogging strollers that is safe, dependable and more user friendly under different folding conditions.

It is thus an aspect of the present invention to provide a new and improved jogging stroller having a folding mechanism providing for improved folding characteristics, more user-friendly operation, and greater variation and flexibility under different folding conditions It is another aspect of the invention to provide a three-wheeled jogging stroller with a user-friendly foldable frame that may be utilized during jogging exercise and that is easily foldable for transit and storage It is also an aspect of the invention to provide a jogging stroller with removable wheels and a foldable or collapsible frame which may be readily assembled and disassembled, and which stroller is compact, stable and lightweight.

In accordance with another aspect of the invention, there is provided an improved collapsible frame for a jogging stroller that is more readily folded and disassembled In accordance with yet another aspect of the invention, there is provided an improved folding mechanism for a three-wheeled jogging stroller that is simple in design and operation

SUMMARY OF THE INVENTION

There is provided a three-wheeled jogging stroller having a foldable, or collapsible frame assembly that is transformable from an erected, or upright, user position to a collapsed storage position of reduced length and height. The foldable frame assembly includes a base, or lower structural assembly, and an upper structural assembly The base assembly includes a rear axle assembly having a member of an enlarged diameter tubular construction with couples at opposite ends thereof for supporting de-mountable or removable large diameter spoked wheels having pneumatic tires. The rear axle assembly has a fork assembly pivotally coupled thereto and a pair of upright support members The fork assembly includes a pair of generally parallel fork members supporting the front wheel at one end thereof, and at the other end the fork members are pivotally coupled to the rear axle member by means of crank or clevis members. The members The pivotable coupling is displaced, or offset, a given distance from the axis of the rear axle member, so that on folding the fork and the upright support members are generally parallel to one another The upper structural assembly includes a unitary handlebar member including a generally U-shaped handlebar portion and a handlebar tube extending in substantially parallel relationship from each end of the U-shaped portion The U-shaped member has a brake lever for a caliper type brake, which engages the rim of the front wheel. The other, or free, ends of each of the substantially parallel handlebar tubes are slidably engaged with a respective interconnect member that is pivotally coupled to the free end of a respective upright support member extending from the rear axle member. Two additional tubes each have first ends fixedly attached to respective interconnects and are curved inwardly to second ends pivotally coupled to the fork members supporting the front wheel A footrest is mounted on these tubes in proximity to the front wheel The interconnect member has hold and release means for holding the upper frame in an upright user position and for releasing the interconnect member to slide up the respective handlebar tube to collapse the upper frame over the base frame. In the process the upright support members pivotally coupled to the interconnects rotate forwardly, the fixed axle also rotating forwardly due to the pivotal coupling to the fork members.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

Figure 1:
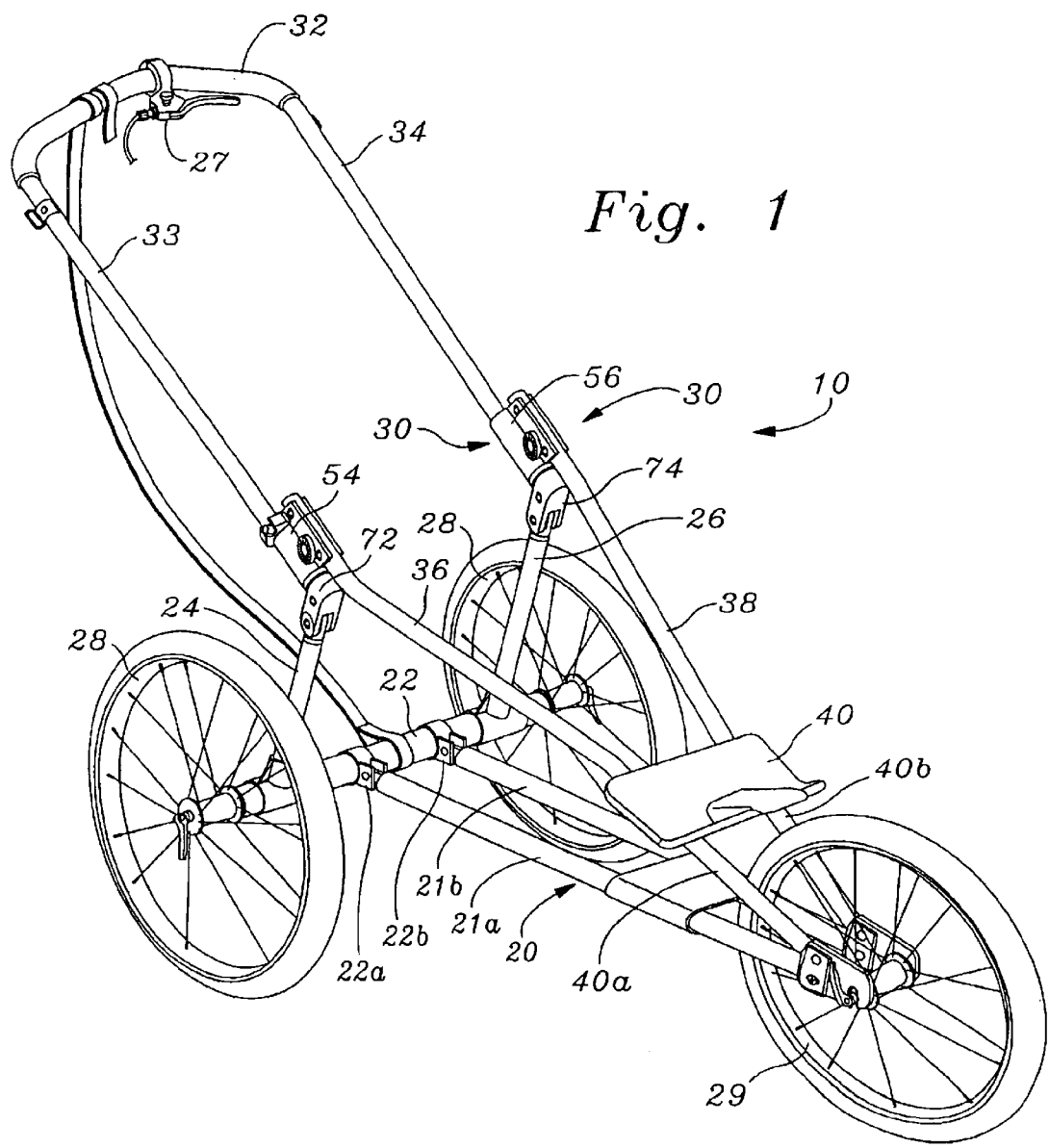
FIG. 1 is a perspective view of the foldable jogging stroller according to the invention.

Referring now to the drawings, and particularly to FIG. 1, there is shown a three-wheeled jogging stroller having a foldable, or collapsible frame assembly that is transformable from an erected, or upright, user position to a collapsed position of reduced length and height for transportation or storage The foldable frame assembly, generally designated 10, includes a lower or base structural assembly, generally designated 20, and an upper structural frame assembly, generally designated 30 The lower assembly 20 includes a rear axle member 22 of an enlarged diameter tubular construction with couples at opposite ends thereof for supporting identical de-mountable or removable, large diameter spoked wheels 28 having pneumatic tires. The lower assembly further includes a pair of upright support members 24, 26, and a fork assembly, generally designated 20, pivotally coupled thereto As will be further explained herein below, the free ends of upright members 24, 26, are pivotally coupled respectively to handlebar tubes 33, 34 The fork assembly 20 includes a pair of fork tubes 21a, 21b, supporting the front wheel 29 at one end thereof, and at the other end pivotally coupled to the rear axle member 22 by means of couplers 22a, 22b The pivotable couplers 22a, 22b are offset a given distance from the center of the rear axle member 22 and may be of any convenient configuration allowing for the upright support members 24, 26 to fold downwardly to the outside of the fork assembly 20 to approach a near parallel relationship as illustrated in FIG. 8 In the embodiment illustrated couplers 22a, 22b are formed with a tubular portion that encircles and is secured to the axial tube 22 and a stub portion for pivotally accepting and securing fork members 21a, 21b The upper structural assembly includes a handlebar member including a generally U-shaped handlebar portion 32 having handle bar arms 33, 34 extending from a respective end of handlebar portion 32 U-shaped member 32 and has a brake lever assembly, generally designated 27, attached substantially at the center thereof, for a caliper type brake (not shown) that engages the rim of the front wheel 29 Member 32 may have handle-gripping material as appropriate As more clearly shown in FIGS. 6–8, U-shaped member 32 has an upturned pushing portion 32a that provides for a more comfortable use as well as providing a more optimum pushing force toward the axis of the front wheel 29

The other ends of the handlebar tubes 33, 34, are slidably coupled respectively through interconnect members 54, 56 and through press-fitted sleeves (see sleeve 71 in FIG. 3) to be fixedly terminated by clevis members 72,74 As will be further explained, clevis members 72,74 pivotally receive the free ends of upright tubes 24, 26 respectively The free ends of U-shaped member 32 are approximately the same distance apart as the interconnect members 54, 56, thus handlebar tubes 33, 34 are substantially parallel to mate properly with interconnects 54, 56

Upper assembly frame tubes 36, 38, are at an upper end engaged with and fixedly attached to interconnect members 54, 56, respectively, and at the other end project downwardly and converge inwardly to connect to a respective fork member at the front wheel.

Figure 2:
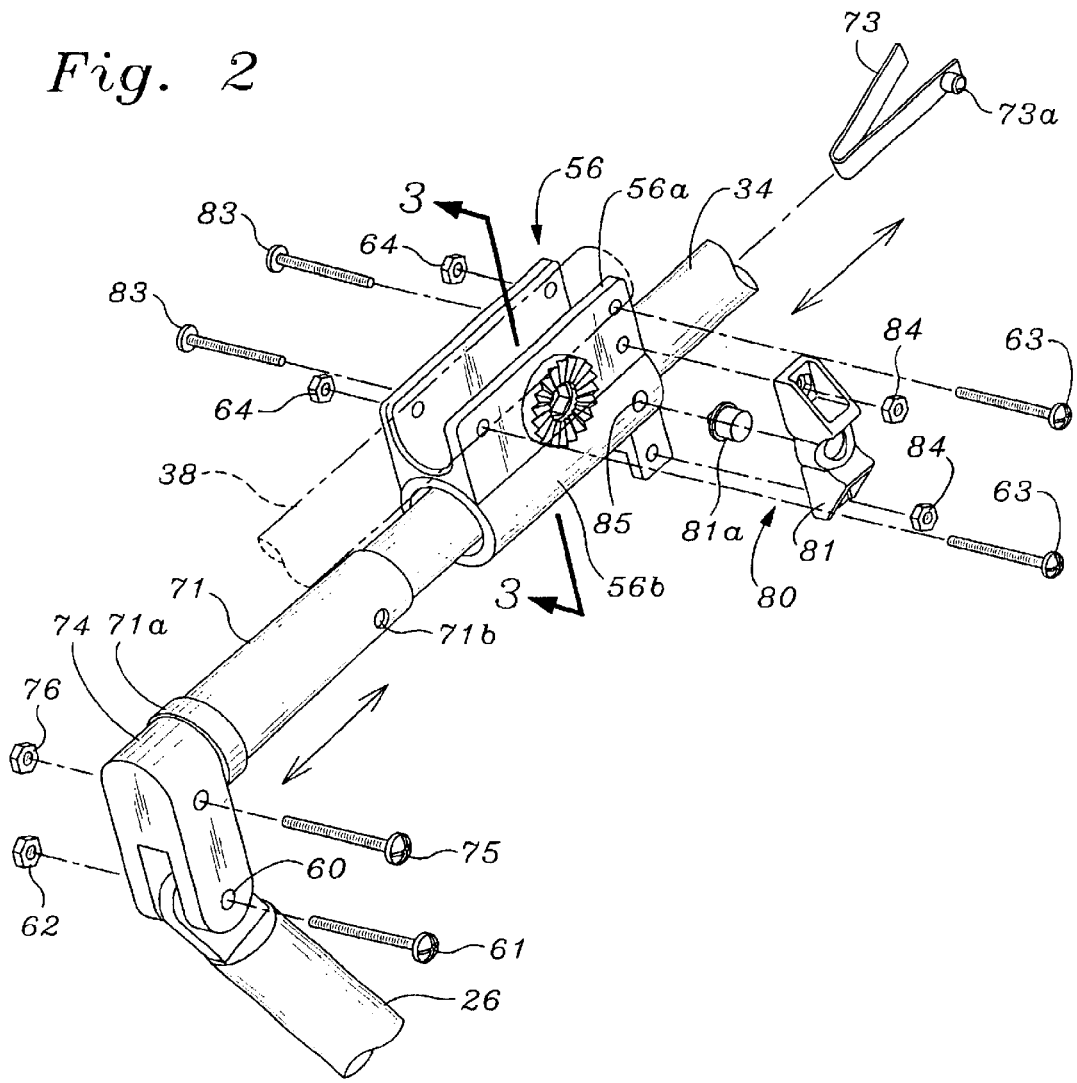
FIG. 2 is a partially exploded perspective view of the interconnection mechanism in accordance with the invention showing the interconnect member, slidable frame member with hold and release mechanism, upright support tube, and in phantom the fixed upper fork tube.
Figure 4:
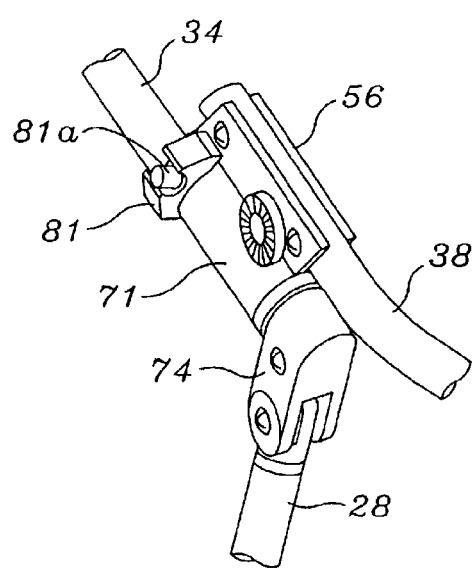
FIG. 4 is a perspective view of the interconnect member of FIG. 2 locked in the erect or user position as shown in FIG. 1.
Figure 5:
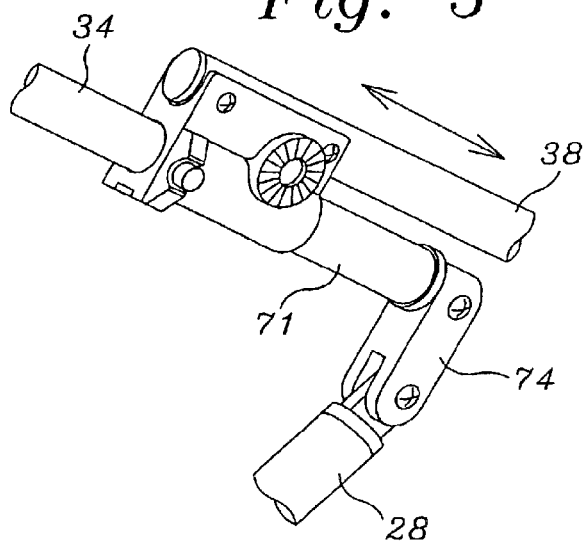
FIG. 5 is a perspective view of the interconnect member of FIG. 2 released as shown in FIG. 7.
Figure 3:
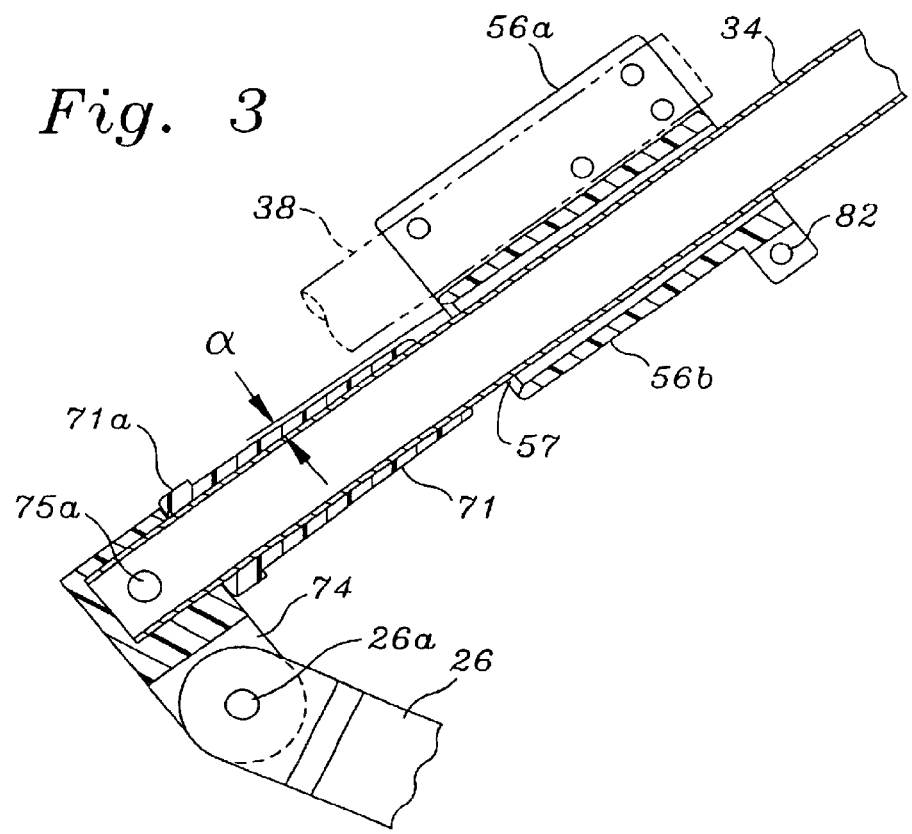
FIG. 3 is a cross-sectional view of the interconnect member of FIG. 2 taken along the line 3—3 thereof.
Figure 7:
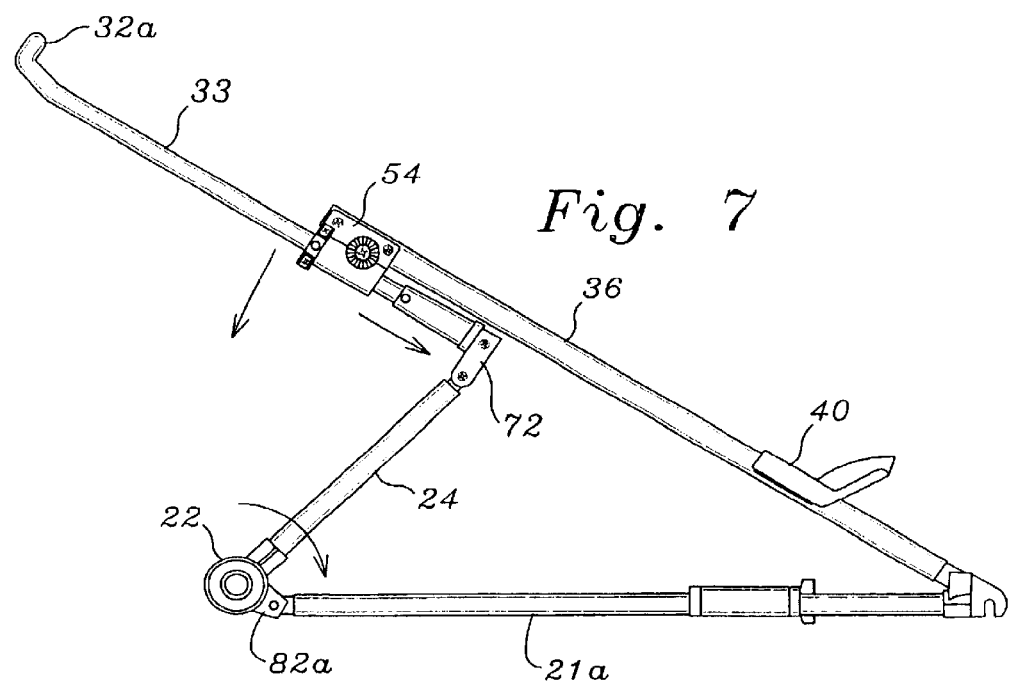
FIG. 7 is a left side elevational view of the stroller foldable frame of FIG. 1 showing the interconnect member partially displaced along a frame member in collapsing the stroller.
Figure 8:
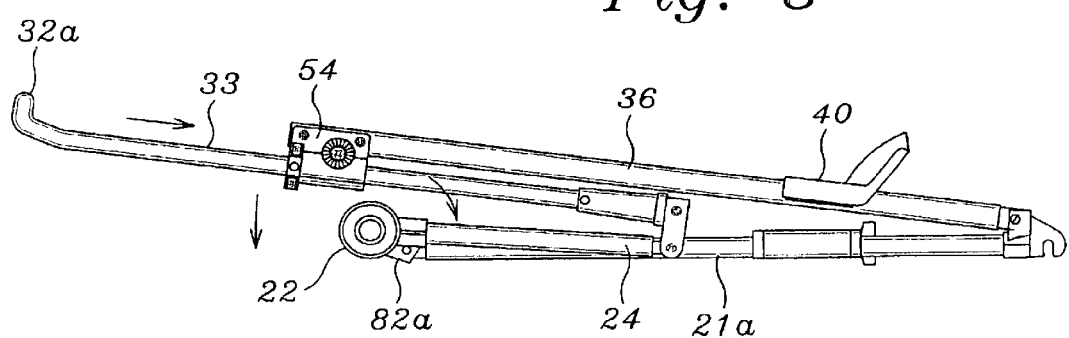
FIG. 8 is a left side elevational view of the foldable frame of the stroller of FIG. 1 showing the interconnect member completely displaced along a frame member to collapse the stroller

As shown more clearly in FIGS. 2 and 3, each interconnect member 54, 56, has associated therewith a hold and release assembly, generally designated 70 When in the locking mode the hold and release assemblies are operable to hold the upper frame in an upright user position When in the release mode the interconnect members are released to slide up the respective tubes 33, 34 to thereby collapse the upper frame onto the base frame The collapsed position is as illustrated in FIGS. 7 and 8

Additional tubes 40a, 40b each have first ends fixedly coupled to the bottom, or lower end, of footrest 40 and then project downwardly and are converged inwardly for coupling the other ends thereof to parallel fork tubes 21a, 21b supporting the front wheel 29 The coupling to the wheel 29 is of the type used in bicycles having quick-release wheels.

Footrest 40 is positioned over tubes 40a, 40b and fixedly attached thereto by welding or riveting at appropriate locations It is formed of a generally trapezoidally configured plate-shaped injected plastic material with the lower, or forward, end thereof bent upwardly to form a splash-guard in the event the front wheel comes into contact with ground water during use The upraised or bent portion provides a better footrest as it also serves as a foot-stop for the occupant. As mounted, footrest 40 provides additional front-end strength and stability Interconnects 54, 56 and associated hold and release mechanisms, are mirror images of each other. Thus, by reference to one interconnect, as illustrated in FIGS. 2 and 3 there is shown interconnect 56 having a saddle-shaped main body portion 56a and a depending tubular portion 56b for slidably receiving handlebar tube 34 through aperture 57. Saddle-shaped body portion 56a is configured and dimensioned for receiving the free end of upper frame tube 38, shown in phantom, that is fixedly positioned and secured therein with first and second bolts 63 and nuts 64. Interconnect 56 The saddle-shaped main body portion 56a has a depth and length sufficient to enable opposing sidewalls to receive a significant length of tube 34 snugly and fully therein in the depth-wise and length-wise directions. This provides stability at the coupling location so that wobbling and rattling is eliminated and the body portion 56a and tube 34 act as an integral unit during use.

Clevis 74 is fixedly attached to the free end of handlebar tube 34 by means of bolt 75, aperture 75a, and nut 76 and pivotally receives, in any appropriate manner, the free end of upright tube 26. As indicated in FIG. 3, the free end of upright 26 is terminated with a bar-shaped flange portion of a thickness less than the diameter of the upright tube 26 and slightly less than the distance between opposing sidewalls of the clevis 74 The flange portion has an aperture 26a therethrough for alignment with like sized aperture 60 extending through the walls of the clevis 74 The aperture 60 is dimensioned for receiving a suitable fastener, such as a bolt 61 and nut 62 for pivotally connecting the free end of the upright tube 26 to clevis 74

The hold and release mechanism for holding the stroller in an erect position and for releasing tube 34 for folding of the upper frame assembly includes sleeve 71 press-fitted over tube 34 adjacent the free end thereof, generally V-shaped spring means 73, and pushbutton release means, generally designated 80 Sleeve 71 includes sleeve cap 71a and aperture 71b that extends through the wall of handlebar tube 34 As indicated in FIG. 3, except for sleeve cap 71a, sleeve 71 has a diameter less than the diameter of interconnect aperture 57 and can be tapered rearwardly upward to cap 71a to facilitate movement of sleeve 71 in and out of aperture 57. Spring means 73 includes locking button 73a, the spring 73 dimensioned and positioned within tube 34 for continued spring tension within the interior of tube 34 to maintain locking button 73a protruding through aperture 71b in sleeve 71 Thus, in the erect, or non-folded state of the stroller frame, sleeve 71 is fully inserted into aperture 57 with locking button 73a forced into interconnect aperture 85 by spring 73a to thereby lock the upper frame into the erect position.

Release pushbutton 81a is securely and slidably positioned within button holder 81, holder 81 mounted onto interconnect 56 over aperture 85 and secured by bolts 83 and nuts 84 Pushbutton 81a is has a contact tip configured and dimensioned for penetrating aperture 85 and has sufficient freedom of depression, or free-floating movement, within holder 81 to disengage locking button 73a to thereby allow sleeve 71 to be released from interconnect 56. This in turn allows for sliding of the interconnect 56 upwardly along the tube 34 to thereby fold the upper frame over the lower assembly as shown in FIG. 8 Thus, in the erected state interconnect 56 is moved along tube 34 until sleeve 71 is inserted into aperture 37 and locking button 73a is forced into aperture 85 under tension from spring 73, thereby to lock the stroller into the erect state For folding, pushbutton 81a is depressed to disengage locking button 73a from aperture 85 to permit movement of interconnect 56 upwardly along tube 34 and to the folding position.

Figure 6:
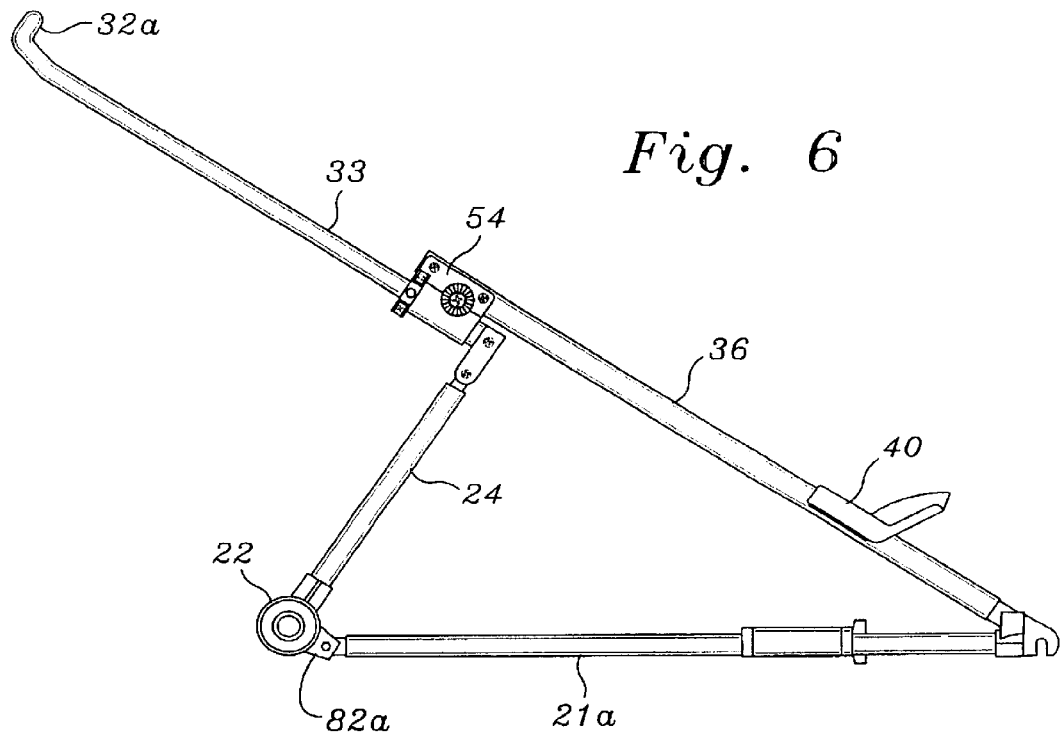
FIG. 6 is a left side elevational view of the stroller foldable frame of FIG. 1 showing the interconnect member locked in the erect or user position.

FIG. 6 illustrates the frame of the invention in the erect position as viewed from the left side with the interconnect locked into the sleeve FIG. 7 illustrates the frame of the invention in an intermediate position as viewed from the left side with the interconnect unlocked from the sleeve and recessed along the handlebar tube The arrows indicate the direction of movement or rotation of the respective members in the folding procedure For instance, respective interconnects are released by respective pushbuttons to slide along respective handlebar tubes, respective uprights are pivoted downwardly toward the lower assembly, and the fixed axle rotates forwardly due to the pivotal coupling to the fork members FIG. 8 illustrates the frame of the invention in the folded position as viewed from the left side with the interconnect fully recessed along the handlebar tube and the upper frame folded over the lower assembly The construction of the jogger stroller 10 is of aluminum tubing that, with the exception of the axle tube 22, are of the same diameter, thus effecting economies of assembly Further, with the exception of the handlebar portion 32 and upper frame tubes 36 and 38, the tubular stock consists of straight or linear lengths of material.

The interconnects are formed of injected plastic of wall thickness sufficient to provide the required strength and stability at points of connection The spacing between opposing walls closely approximate the diameter of the tube sections for lateral as well as lengthwise stability In use, the stroller 10 is stable and efficient in the use of the energy of the operator, whether while walking, jogging or running While there has been shown and described a preferred embodiment, it is understood that other adaptations and modifications may be made without departing from the spirit and scope of the invention Further, although the description has utilized directional references, such a up, down, left, right, upwardly, downwardly, etc, these terms are utilized with reference to the orientations in the figures and are not intended to be limiting

What is claimed is:

1. A foldable stroller for use while walking or running, said stroller comprising:

two rear wheels and a front wheel;

a base structural assembly including a rear axle member which couples at opposite ends thereof for removably supporting said two rear wheels, a pair of upright support members pivotally coupled to said axle, and a fork assembly pivotally coupled to said axle for supporting said front wheel;

an upper structural assembly including a handlebar portion with handlebar tubes extending from each end of said handlebar portion, the free ends of said handlebar tubes pivotally coupled to the free end of a respective one of said upright support members, an interconnect member slidably mounted on a respective one of said handlebar tubes, and an upper frame support tube fixedly mounted at one end to a respective interconnect member and at the other end connecting to a respective one of said fork assembly at said front wheel; and said interconnect members have hold and release means for locking said stroller in an upright user position and for releasing the interconnect members to slide up the respective handlebar tube whereby said pivotable upright support members rotate forwardly due to pivotal coupling to said handlebar tubes and said axle member rotates forwardly due to pivotal coupling to said fork members to collapse said upper structural assembly over said base structural assembly.

2. The stroller of claim 1 wherein said hold and release means includes a sleeve mounted onto said handlebar tube and having an averture extending through the wall of said handlebar tube;

locking means protruding through said aperture for coaction with said interconnect member whereby upon insertion of said sleeve into said interconnect member said locking means locks said handlebar tube within said interconnect member; and said interconnect member has release means for disengaging said locking means thereby releasing said handlebar tube from said interconnect member.

3. The stroller of claim 2 wherein said locking means is a spring urged locking button and said release means is a pushbutton for depressing said locking button.

4. The stroller of claim 1 wherein said interconnect members each have a saddle shaped portion for fixedly receiving a respective upper structural assembly tube and a tubular portion for slidably receiving a respective handlebar tube therethrough.

5. The stroller of claim 1 wherein said upright support members are displaced on said axle such that upon collapsing of said stroller said support members are outside of said fork assembly and substantially parallel thereto.

6. An mechanism for folding a jogging stroller, comprising an interconnect having a first portion configured for fixedly receiving and securing an end of a first frame tube and a second portion configured for slidably receiving a second frame tube therethrough;

a sleeve fixedly mounted onto said second frame tube and having an aperture extending through the wall of said second frame tube;

a spring within said second frame tube having a locking button, said spring positioned such that spring tension provides that said locking button protrudes through said aperture such that upon insertion of said sleeve into said interconnect said locking button protrudes into said interconnect to thereby lock said second frame tube within said interconnect member;

a push button positioned on said interconnect having access to said locking button whereby pressure from said push button disengages said locking button to thereby release said second frame tube from said interconnect member; and said sleeve includes a cap for limiting insertion of said sleeve into said interconnect member and said sleeve is tapered downwardly from said cap to the insertion end thereof to facilitate movement of said sleeve within said interconnect member.

* * * * *